(12) United States Patent
Dehm et al.

(10) Patent No.: US 10,626,223 B2
(45) Date of Patent: Apr. 21, 2020

(54) POLYURETHANE-ORGANOPOLYSILOXANES

(71) Applicant: RUDOLF GMBH

(72) Inventors: Volker Dehm, Wolfratshausen (DE); Gunther Duschek, Benediktbeuern (DE); Rainer Hayessen, Geretsried (DE); Dirk Sielemann, Wolfratshausen (DE); Martin Teichert, Wolfratshausen (DE); Maximilian Schubert, Geretsried (DE)

(73) Assignee: RUDOLF GMBH, Geretsried (DE)

( * ) Notice: Subject to any disclaimer, the term of this patent is extended or adjusted under 35 U.S.C. 154(b) by 208 days.

(21) Appl. No.: 15/576,439

(22) PCT Filed: May 24, 2016

(86) PCT No.: PCT/EP2016/061684
§ 371 (c)(1),
(2) Date: Nov. 22, 2017

(87) PCT Pub. No.: WO2016/188994
PCT Pub. Date: Dec. 1, 2016

(65) Prior Publication Data
US 2018/0155503 A1   Jun. 7, 2018

(30) Foreign Application Priority Data
May 26, 2015   (DE) .................... 10 2015 209 627

(51) Int. Cl.
| | | |
|---|---|---|
| *C08G 77/46* | (2006.01) | |
| *C08G 77/388* | (2006.01) | |
| *D06M 15/647* | (2006.01) | |
| *D06M 15/564* | (2006.01) | |
| *D06M 15/653* | (2006.01) | |
| *C08G 77/14* | (2006.01) | |

(52) U.S. Cl.
CPC .......... *C08G 77/388* (2013.01); *C08G 77/46* (2013.01); *D06M 15/564* (2013.01); *D06M 15/647* (2013.01); *D06M 15/653* (2013.01); *C08G 77/14* (2013.01); *D06M 2200/50* (2013.01)

(58) Field of Classification Search
None
See application file for complete search history.

(56) References Cited

U.S. PATENT DOCUMENTS

| | | | |
|---|---|---|---|
| 4,891,166 A | 1/1990 | Schaefer et al. | |
| 5,880,245 A * | 3/1999 | Fujita ................... | C08G 65/336 525/403 |
| 6,495,727 B1 | 12/2002 | Jordan, IV et al. | |
| 7,348,392 B2 | 3/2008 | Smith | |
| 8,309,673 B2 * | 11/2012 | Schubert ............ | C08G 65/2606 528/26 |
| 2004/0048996 A1 * | 3/2004 | Lange .................... | A61K 8/898 528/10 |
| 2004/0210010 A1 | 10/2004 | Smith | |
| 2006/0035031 A1 | 2/2006 | Smith | |
| 2006/0047091 A1 | 3/2006 | Smith | |
| 2006/0084767 A1 | 4/2006 | Smith | |
| 2007/0055016 A1 * | 3/2007 | Niesten ................ | C08G 18/706 525/100 |
| 2007/0117656 A1 * | 5/2007 | Rajagopalan ....... | A63B 37/0003 473/371 |
| 2008/0213208 A1 * | 9/2008 | Moeller ................. | A61K 8/898 424/78.03 |
| 2010/0081781 A1 * | 4/2010 | Schubert ................ | C08G 65/22 528/14 |
| 2011/0243871 A1 * | 10/2011 | Panandiker .......... | C08G 77/388 424/70.12 |
| 2016/0024314 A1 * | 1/2016 | Olsen ................... | C09D 5/1693 428/447 |
| 2018/0151264 A1 * | 5/2018 | Hanada ..................... | G21F 9/12 |

FOREIGN PATENT DOCUMENTS

| | | | |
|---|---|---|---|
| DE | 1 493 384 | 7/1965 | |
| DE | 19524816 A1 * | 1/1997 | ............. C08G 18/61 |
| DE | 10 2005 056 864 | 5/2007 | |
| DE | 10 2007 023 869 | 12/2008 | |
| DE | 10 2007 027 027 | 12/2008 | |
| DE | 10 2013 211 349 | 12/2014 | |
| DE | 10 2013 106 905 | 1/2015 | |
| DE | 10 2013 106 906 | 1/2015 | |
| EP | 0 002 519 | 6/1979 | |
| EP | 1 753 804 | 4/2008 | |
| WO | 03/095735 | 11/2003 | |
| WO | 2004/044306 | 5/2004 | |
| WO | 2005/121218 | 12/2005 | |
| WO | WO-2013062044 A1 * | 5/2013 | ............... G21F 9/12 |
| WO | WO-2013172177 A1 * | 11/2013 | ............. C08L 83/04 |

OTHER PUBLICATIONS

German Search Report/Office Action conducted in counterpart German Appln. No. 10 2015 209 627.0 (dated Jan. 15, 2016) (w/ partial machine translation).

Translation of Int'l Written Opinion conducted in Int'l Appln. No. PCT/EP2016/061684 (Form PCT/ISA/237) (dated Jul. 20, 2016).

Office Action in patent family member Indian Application No. 201727042094 dated Jan. 17, 2020.

* cited by examiner

*Primary Examiner* — Robert S Loewe
(74) *Attorney, Agent, or Firm* — Greenblum & Bernstein, P.L.C.

(57) ABSTRACT

The invention relates to polyurethane organopolysiloxanes and their applications, in particular for the finishing of textile fabrics and textile fibres.

20 Claims, No Drawings

POLYURETHANE-ORGANOPOLYSILOXANES

The invention relates to polyurethane organopolysiloxanes and their applications, in particular for the finishing of textile fabrics and textile fibres.

Amino group-containing polysiloxanes have been used for a considerable time as textile finishing agents. Good soft feel effects are achieved with textiles treated in this way. Normally the polysiloxanes are applied as a liquid preparation, for example in the form of aqueous emulsions, to the textile. In this connection, in order to improve the emulsifiability of the polysiloxane the amino groups are protonated by addition of an acid to the formulation.

The problem of the preparations that contain aminofunctional polysiloxanes is the sensitivity of the application baths prepared therefrom to fluctuations in the pH value. Thus, in these systems precipitations of the polysiloxane or a phase separation are observed at higher pH values, for example at a pH>7. This is attributed to the fact that the amino groups in the base pH range are no longer present in protonated form. A homogeneous application of the soft feel agent is no longer guaranteed under these conditions, and the formation of silicone spots is often observed on the textile. Specifically in the textile refining process a great many treatment steps are carried out in a strongly alkaline medium. If the wash processes have not been carried out thoroughly residual amounts of alkalis may remain on the substrate and during the subsequent refining steps may be entrained in the treatment baths. In particular on machines using a small amount of treatment liquor, such as for example a Foulard or padding machine, the pH value of the finishing liquor can in this case rise to >9 in a very short time. This therefore leads in certain cases to the aforementioned marked precipitations.

In WO 2004/044306 and WO 03/095735 polysiloxanes containing quaternary amino groups are described. The quaternary amino groups are always present as cationic groups in both the acidic and basic pH range. Emulsions produced from these have a good stability and in use only rarely lead to the formation of spots.

A further disadvantage of many polysiloxanes containing amino or ammonium groups is their sensitivity to anionic substances. Anionic surfactants are frequently used in the pre-treatment, and during washing and dyeing. Also many post-treatment agents for improving the fastness of dyes are based on anionic polymers. If such substances are not thoroughly removed by washing these can interfere in the refining process during the application of the soft feel agent, in that they block the cationic amino groups by salt formation. This leads to a destabilisation of the emulsion in the application liquor and frequently also to the formation of silicone spots.

Ammonium-modified and polyether-modified organopolysiloxanes are described in DE 10 2005 056 864. The polysiloxanes are prepared from an epoxy-functional organopolysiloxane, which is reacted with amines and alkyl alcohol alkoxylates. A quaternisation with an alkylating agent is then carried out. The organopolysiloxanes are used for finishing textile substrates and are characterised by good soft feel effects and a high yellowing resistance. On account of the terminal polyether and ammonium groups these systems have a good pH stability. In addition the preparations described there are suitable for use in combination with hydrophobisation agents, without adversely affecting the oil and water repellent effect.

WO 2005/121218 describes a method for producing siloxane copolymers, in which modified organopolysiloxanes with a terminal hydroxy group are reacted with diisocyanates or polyisocyanates. The compounds are used for modifying the soft feel of fibrous substrates and are characterised by a good hydrophilicity on these.

Surprisingly it was now found that polyurethane organopolysiloxanes with side polyether groups, which can be obtained by reacting hydroxy-modified organopolysiloxanes with diisocyanates or polyisocyanates, produce outstanding soft feel effects on textiles. The polyurethane organopolysiloxanes according to the invention can be emulsified in aqueous medium without or with only small amounts of additional surfactants. The negative influences on foam formation and dye migration that are otherwise associated with surfactants can be minimised. The formulations that are based on such polyurethane organopolysiloxanes have a very good pH stability and anion stability in use and also a very good stability to shear stress.

In a first aspect the present invention therefore relates to a polysiloxane obtainable by a method comprising the following steps:

(i) providing at least one reaction product (I) of a compound (II) having the formula

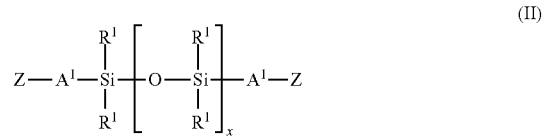

(II)

wherein $R^1$ may be identical or different and denotes an optionally substituted hydrocarbon radical with 1-18 carbon atoms per radical, $A^1$ denotes independently of one another a divalent linear or branched group with up to 8 carbon atoms and optionally with up to 4 hetero atoms, x is an integer from 1 to 1000, preferably 1 to 500, and Z is

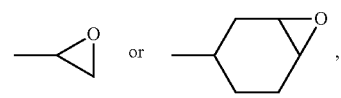

optionally substituted by $C_{1-8}$-alkyl, with at least one compound (III) selected from primary amine, secondary amine and monohydric alcohol, which optionally contains at least one polyether radical, wherein at least one reaction product (I) contains at least one polyether radical that was introduced by the compound (III);

(ii) optionally providing at least one compound (IV) of the formula

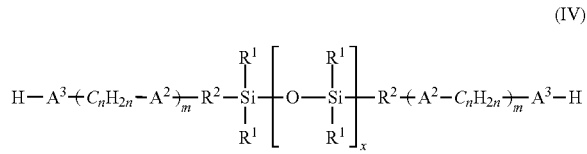

(IV)

wherein $R^1$ and x are as defined above, $R^2$ is independently of one another a divalent branched or linear $C_{2-8}$-alkyl, optionally substituted with carbonyl, $A^2$ independently of one another is selected from the group consisting of —O—, —C(O)—O—, —O—C(O)—, —O—C(O)—O—, —C(O)—NH—, —NH—C(O)—, —NH—C(O)—O— and —NH—C(O)—NH—

$A^3$ independently of one another is selected from the group consisting of —O—, —NHH— and —NR'—, R' is a monovalent hydrocarbon radical with 1 to 18 carbon atoms, n independently of one another is an integer from 1 to 20, preferably 2 or 3, and m independently of one another is an integer from 0 to 150, preferably 0 to 70, more preferably 0 to 30;

(iii) optionally equilibrating least one reaction product (I) and/or at least one compound (IV) with a cyclic or linear polysiloxane, and (iv) reacting the reaction product (I) or of the equilibrated reaction product (I) from step (iii) and optionally the compound (IV) or the equilibrated compound (IV) from step (iii) with at least one organic compound (V) that contains at least two isocyanate groups per molecule.

In step (i) the reaction product (I) is obtained by reacting the compound (II)

$$Z-A^1-\underset{\underset{R^1}{|}}{\overset{\overset{R^1}{|}}{Si}}-\left[O-\underset{\underset{R^1}{|}}{\overset{\overset{R^1}{|}}{Si}}\right]_x-A^1-Z \quad \text{(II)}$$

with the compound (III).

In a preferred embodiment of the invention $R^1$ is independently of one another a hydrocarbon radical with 1-18 carbon atoms per radical. Preferably the hydrocarbon radical is independently of one another $C_{1-18}$-alkyl, aryl, such as e.g. phenyl, naphthyl, anthryl or phenanthryl, alkaryl, such as e.g. toluene, or aralkyl, such as e.g. benzyl.

Alkyl or alkyl defined by the number of carbon atoms, e.g. $C_{1-18}$-alkyl, denotes in the present invention a linear, branched or cyclic saturated hydrocarbon radical. In a preferred embodiment a $C_{1-18}$-alkyl radical includes for example a methyl, ethyl, n-propyl, isopropyl, n-butyl, isobutyl, tert.-butyl, n-pentyl, isopentyl, neopentyl, tert.-pentyl, n-hexyl, isohexyl, n-heptyl, isoheptyl, n-octyl, isooctyl, n-nonyl, isononyl, n-decyl, isodecyl, n-dodecyl, isododecyl, n-octadecyl and $C_{3-18}$-cycloalkyl radical, such as for example a cyclopentyl, cyclohexyl, cycloheptyl and methylcyclohexyl radical.

More preferably $R^1$ is selected from the group consisting of $C_{1-6}$-alkyl, aryl or aralkyl, still more preferably $C_{1-6}$-alkyl, aryl or benzyl, even more preferably $C_{1-6}$-alkyl, yet more preferably methyl or ethyl, and most preferably methyl.

The hydrocarbon can furthermore be substituted. Suitable substituents are preferably halogen, such as for example fluorine, chlorine, bromine and iodine, as well as hydroxyl.

$A^1$ is independently of one another a divalent linear or branched group with up to 8 carbon atoms and optionally with up to 4 hetero atoms, such as for example oxygen, sulphur or nitrogen. Preferably $A^1$ is a divalent linear or branched group with up to 8 carbon atoms and optionally with one hetero atom, in particular oxygen.

In a preferred embodiment $A^1$ is $C_{1-8}$-alkyl or —$C_{1-6}$-alkyl-O—$C_{1-6}$-alkyl-. In a particularly preferred embodiment $A^1$ is $C_{2-3}$-alkyl-O—$C_{1-3}$-alkyl, still more preferably —$CH_2$—$CH_2$—$CH_2$—O—$CH_2$—.

Z is an epoxy group selected from

[epoxide structures]

optionally substituted with $C_{1-8}$-alkyl.

Preferably Z is

[epoxide structures]

x is an integer from 1-1000, preferably from 1-500, more preferably from 1-250.

In a preferred embodiment the compound (II) is

[structure of compound II with epoxide-terminated siloxane]

The compound (III) is a primary amine, i.e. $RNH_2$, a secondary amine, i.e. $R_2NH$ or a monohydric alcohol, i.e. R—OH, wherein R in each case independently denotes an organic radical, wherein at least one R in the compound (III) may contain a polyether radical. The term polyether radical is here understood to mean a grouping of the formula (—$C_nH_{2n}$—O—)$_m$ where n and m are defined as hereinbefore.

The compound (III) is preferably selected from $$HO-(-C_nH_{2n}-A^2-)_m R^3 \quad \text{(IIIa)}$$

and $$HN\underset{R^{4'}}{\overset{R^4}{\diagup}} \quad \text{(IIIb)}$$

$A^2$ is independently of one another selected from the group consisting of —O—, —C(O)—O—, —O—O(O)—, —O—C(O)—O—, —O(O)—NH—, —NH—C(O)—, —NH—C(O)—O— and —NH—C(O)—NH—, preferably —O—, more preferably in each case —O—.

n is independently of one another an integer from 1 to 20, preferably 2 to 5, more preferably 2 or 3.

m is an integer from 0-150, preferably 0-70, more preferably 0-30 and most preferably 1-30. In another embodiment m is 1-70, preferably 1-30, more preferably 5-30. In the formula (IIIa) m is preferably 1-70, more preferably 5-70 and most preferably 1-30.

$R^3$ is $C_{1-22}$-alkyl, $C_2$-$C_{22}$-alkenyl, $C_2$-$C_{22}$-alkynyl, $C_{6-22}$-alkaryl, such as e.g. toluene, $C_{6-22}$-aralkyl, such as e.g. benzyl or aryl, e.g. phenyl, naphthyl, anthryl or phenanthryl, optionally substituted with at least one styryl. Preferably $R^3$ is $C_{1-22}$-alkyl, $C_2$-$C_{22}$-alkenyl, $C_2$-$C_{22}$-alkynyl, $C_{6-22}$-alkaryl, such as e.g. toluene, or aryl, for example phenyl, naphthyl, anthryl or phenanthryl, optionally substituted with at least one styryl. More preferably $R^3$ is selected from $C_{1-22}$-alkyl, $C_2$-$C_{22}$-alkenyl, $C_2$-$C_{22}$-alkynyl, phenyl, toluene and tri-styrylphenyl. Most preferably $R^3$ is selected from $C_{1-22}$-alkyl and phenyl.

$R^4$ is H, $C_{1-8}$-alkyl, aryl, such as e.g. phenyl or —$(C_nH_{2n}$-$A^2)_m$-$R^3$. Preferably $R^4$ is H, methyl, ethyl, cyclohexyl, phenyl or —$(C_nH_{2n}$—O$)_m$—$R^3$.

$R^{4'}$ is $C_{1-8}$-alkyl, aryl or —$(C_nH_{2n}$-$A^2)_m$-$R^3$. Preferably $R^{4'}$ is methyl, ethyl, cyclohexyl, phenyl and —$(C_nH_{2n}$—O$)_m$—$R^3$.

Particularly preferably alkoxylation products of aliphatic alcohols having 1-22 carbon atoms are used as monohydric alcohol (IIIa) The alkylene oxide residue is preferably built up from ethylene oxide and/or propylene oxide units. The building blocks can be present in a random or block-like distribution. Particularly preferred are aliphatic alcohol ethoxylates with a degree of ethoxylation of 1-30.

In particular methyl-capped alkoxylated primary monoamines, which are commercially obtainable under the trade name Jeffamine®, are used as compound (IIIa).

Preferably a stoichiometric ratio of epoxy group to compound (III) (primary amine, secondary amine or monohydric alcohol) of 1:1 is chosen for the preparation of the reaction product (I).

The preparation of the reaction product (I) is carried out according to methods that are known to the person skilled in the art. The compound (II) can starting from siloxanes with terminal Si—H units undergo a hydrosilylation, as described for example in DE 1493384 and U.S. Pat. No. 4,891,166. The addition reaction with the reaction product (I) is variable; the compound (II) or compound (III) is taken and the respective other compound is then added dropwise at temperatures between 100-200° C. while stirring. The addition reaction can however also be carried out by mixing the compounds (II) and (III) while stirring at elevated temperature (e.g. at 100-200° C.). The conversion to the reaction product (I) can take place with the use of basic catalysts, such as e.g. sodium hydroxide or potassium methylate, as described for example in U.S. Pat. No. 6,495,727. Alternatively the conversion to the reaction product (I) can take place in the presence of acidic catalysts, such as for example boron trifluoride diethyl etherate, as described for example in EP 0 002 519 (Example 1). If the miscibility of the two educts is poor, the addition of a non-protonic solvent may be helpful.

In the conversion to the reaction product (I) a nucleophilic attack of the amine and/or alcohol group of the compound (III) on the epoxy group of the compound (II) takes place, resulting in a ring opening of the epoxide and formation of a hydroxyl group. The hydroxyl group formed in the addition reaction is reactive to isocyanate and can react in the step (iv) with the compound (V), whereby side polyether groups are formed.

In step (i) preferably only one reaction product (I) is provided, in which connection the reaction product contains at least one polyether residue. If mixtures of reaction products (I) are used, then preferably at least 40 to 100 mol %, more preferably 60 to 100 mol %, of all reaction products (I) contain at least one polyether residue.

In step (ii) optionally at least one compound (IV) of the formula

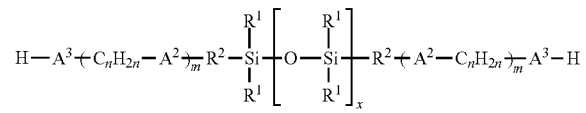

is provided, wherein $R^1$ is identical or different and denotes an optionally substituted hydrocarbon radical with 1-18 carbon atoms per radical. In a preferred embodiment of the invention $R^1$ is independently of one another a hydrocarbon radical with 1-18 carbon atoms per radical. Preferably the hydrocarbon radical is independently of one another $C_{1-18}$-alkyl, aryl, such as e.g. phenyl, naphthyl, anthryl or phenanthryl, alkaryl, such as e.g. toluene or aralkyl, such as e.g. benzyl.

Preferably $R^1$ is selected from the group consisting of $C_{1-8}$-alkyl, aryl or aralkyl, more preferably $C_{1-8}$-alkyl, aryl or benzyl, still more preferably $C_{1-6}$-alkyl, even more preferably methyl or ethyl, and most preferably methyl.

The hydrocarbon may furthermore be substituted. Suitable substituents are preferably halogen, such as for example fluorine, chlorine, bromine and iodine, and also hydroxyl.

$R^2$ is independently of one another a divalent branched or linear $C_{2-8}$-alkyl, optionally substituted with carbonyl. In a preferred embodiment $R^2$ is independently of one another a divalent branched or linear $C_{2-8}$-alkyl, in particular ethyl, n-propyl or n-butyl, preferably n-propyl.

$A^2$ is independently of one another selected from the group consisting of —O—, —C(O)—O—, —O—C(O), —O—C(O)—O—, —C(O)—NH—, —NH—C(O)—, —NH—C(O)—O— and —NH—C(O)—NH, preferably —O—, more preferably in each case —O—.

$A^3$ independently of one another is selected from the group consisting of —O—, —NH— and —NR'—, wherein R' is a monovalent hydrocarbon radical with 1 to 18 carbon atoms, preferably $C_{1-18}$-alkyl, more preferably methyl or ethyl. Preferably $A^3$ is in each case —O—.

n is independently of one another an integer from 1 to 20, preferably 2 or 3, particularly preferably 2.

m is an integer from 0-150, preferably 0-70, more preferably 0-30 and most preferably 1-30. In another embodiment m is 1-70, preferably 1-30.

x is an integer from 1-1000, preferably 1-500, more preferably 1-250.

In a particularly preferred implementation variant the compound of the formula (IV) is

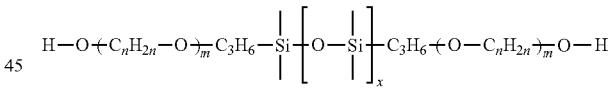

where n is equal to 2 and/or 3.

The reaction with the isocyanate compound (V) can therefore take place via the terminal isocyanate-reactive OH group.

The reaction product (I) and compound (IV) can be present either in a mixture or separately from one another.

The preparation of the compound (IV) can take place in a similar way to the preparation of the compound (II) via a hydrosilylation, as is known to the person skilled in the art.

According to step (iii) the reaction product (I) and/or the compound (IV) is optionally equilibrated with a cyclic or linear polysiloxane. Equilibration reactions are known to the person skilled in the art. By means of the equilibration reaction the siloxane units in the compounds (I) and (IV), are split, whereby the fragments randomly recombine. In the equilibration reaction the number x of the siloxane repeating units in the compounds (I) and/or (IV) may optionally be increased, with the simultaneous decomposition of the added polysiloxane. Preferably in step (iii) x can be increased from 1 up to 1000, preferably up to 500, more preferably up to 250. The equilibration is preferably carried out under base or acid, preferably base catalysis, while stirring at temperatures of 100-180° C.

The catalyst is neutralised after the reaction and is optionally separated. Volatile constituents are optionally distilled off.

Suitable base catalysts are alkali metal hydroxides, alkali metal alcoholates, tetramethylammonium hydroxide, tetramethylphosphonium hydroxide. Acid catalysts that may be used are for example sulphuric acid, trifluoromethanesulphonic acid or acid ion exchange resins.

As preferred cyclic or linear polysiloxane, in step (iii) there is used polydi-$C_{1-6}$-alkyl siloxane, more preferably polydimethylsiloxane, still more preferably oligodimethylsiloxane, even more preferably cyclic oligo- or polydimethylsiloxane. In particular hexamethylcyclotrisiloxane, octamethylcyclotetrasiloxane, decamethylcyclopentasiloxane and mixtures of these are suitable.

The linear polysiloxanes mentioned above are preferably terminated with $C_{1-8}$-alkyl, particularly preferably with hydroxyl groups. α,ω-OH-terminated linear polydimethyldisiloxane is particularly preferred.

In step (iv) the reaction product (I) or the equilibrated reaction product (I) from step (iii) and optionally the compound (IV) or the equilibrated compound (IV) from step (iii) is reacted with at least one organic compound (V) that contains at least two isocyanate groups per molecule.

In a preferred embodiment, in step (iv) in the reaction product (I) or in the equilibrated reaction product (I) from step (iii) and optionally in the compound (IV) or in the equilibrated reaction product (IV) from step (iii) x is 10 to 1000 and preferably 10 to 500.

Preferably the compound (V) is selected from hexamethylene-1,6-diisocyanate, isophorone diisocyanate, toluylene-2,4-diisocynate, toluylene-2,6-diisocyanate, phenylene-1,3-diisocyanate, 4,4'-methylene-bis(cyclohexyl isocyanate), 4,4'-methylene-bis(phenyl isocyanate) and dimethylphenyl diisocynate, and particularly preferably is hexamethylene-1,6-diisocyanate and isophorone diisocyanate.

Step (iv) is carried out under conditions such that the hydroxyl group formed in the reaction product (I) by opening of the epoxy ring reacts with the isocyanate group-containing compound (V). If the reaction product (I) contains secondary amino groups, the secondary amine formed therefrom is isocyanate-reactive.

The reaction is preferably carried out at temperatures above room temperature (20° C.), optionally with the use of at least one solvent and/or a catalyst. In a preferred embodiment the reaction is carried out at 30 to 100° C., more preferably at 40 to 80° C. If a solvent is used, then in particular non-protic solvents such as e.g. acetone, methyl propyl ketone, ethyl acetate and isopropyl acetate are suitable for this purpose. These are removed by distillation after the reaction. Water-soluble solvents may however also be used, which after the reaction remain in the product and may be helpful in the emulsification of the polyurethane organopolysiloxane. Examples of such solvents are dipropylene glycol dimethyl ether and propylene glycol methyl ether acetate. Suitable catalysts include in particular di-n-butyl tin dilaurate, tin (II) octoate, dibutyl tin diacetate, potassium octoate, zinc dilaurate, bismuth trilaurate or tertiary amines, such as dimethylcyclohexylamine, dimethylaminopropyldipropanolamine, pentamethyldipropylenetriamine, N-methylimidazole or N-ethylmorpholine.

In step (iv) furthermore at least one compound (VI) which contains at least one isocyanate-reactive group, e.g. —OH, —NH₂ or —NHR, may be present. In a preferred embodiment the compound (VI) is selected from

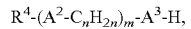

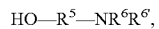

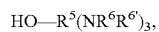

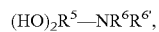

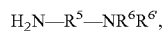

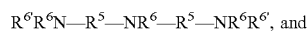

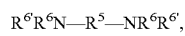

wherein
$R^4$, $A^2$, $A^3$, n and m are as defined above,
$R^5$ independently of one another is optionally substituted divalent, trivalent or tetravalent $C_{1-8}$-alkyl, $C_{1-8}$-alkyl-O—$C_{1-8}$-alkyl or aryl, e.g. phenyl,
$R^6$ is H, optionally substituted $C_{1-18}$-alkyl or aryl, e.g. phenyl, and
$R^{6'}$ is optionally substituted $C_{1-18}$-alkyl or aryl, e.g. phenyl, or
$R^6$ and $R^{6'}$ together with the nitrogen atom form a heterocycle, which may optionally contain further hetero atoms, such as for example O, S and N, preferably O, and is optionally substituted with $C_{1-8}$-alkyl. Thus, $R^6$ and $R^{6'}$ together with the nitrogen atom preferably form a piperazine, piperidine, pyrrolidine or morph oline radical, which is optionally substituted with $C_{1-8}$-alkyl.
$R^5$, $R^6$, $R^{6'}$ are—if they are not unsubstituted—independently of one another preferably substituted with hydroxyl groups.

Preferably the compounds (VI) are selected from methyl polyethylene oxide, butyl polyethylene oxide, methyl polyethylene oxide/propylene oxide, methyl propylene oxide, N-methyl diethanolamine, N-methyl dipropanolamine, dimethylaminopropyl dipropanolamine, N-dodecyl diethanolamine and N-stearyl dipropanolamine, N,N-dimethyl ethanolamine, N,N-diethyl propanolamine, N, N-dimethylaminopropylmethyl ethanolamine, dimethyl-2-(2)aminoethoxy) ethanol, 1,5-bis(dimethylamino)-pentan-3-ol, 1,5-bis (methylamino)-pentan-3-ol, 1,7-bis(dimethylamino)-heptan-4-ol, N,N-bis-(3-dimethylaminopropyl)-N-isopropanolamine, 2,4,6-tris(dimethylaminomethyl) phenol, 1,1,1-tris(dimethylaminomethyl) methanol, 2,4,6-tris(dimethylaminomethyl)cyclohexanol, N,N-bis(dimethylaminopropyl)-3-aminopropan-1,2-diol, N,N-bis(dimethylaminopropyl)-2-aminopropan-1,3-diol, N—N-bis(3-dimethylaminopropyl)-carbamic acid monoglyceride, dibutylamine, octylamine, benzylamine, 3-(cyclohexylamino)-propylamine, 2-(diethylamino)-ethylamine, dipropylenetriamine, isophorone diamine, dimethylaminopropylmethylamine, N,N-bis(dimethylaminopropyl)-amine, dimethylaminopropylamine, N,N,N'-trimethyl-N'-hydroxyethyl-bisaminoethyl ether, N-(3-dimethylaminopropyl)-N, N-diisopropanolamine, N-(3-dimethylaminopropyl)-N,N-diisopropanolamine, 2-(2-dimethylaminoethoxy)ethanol, N,N,N'-trimethylaminoethyl ethanolamine, pyrrolidine, piperidine, N-methylpiperazine, and morpholine.

Particularly preferably the compounds (VI) are selected from N-methyldiethanolamine, N,N-dimethylethanolamine, N,N-bis(dimethylaminopropyl)-amine, N,N,N'-trimethyl-N'-hydroxyethyl bisaminoethyl ether, N-(3-dimethylaminopropyl)-N,N-diisopropanolamine, N-(3-dimethylaminopropyl)-N, N-diisopropanolamine, 2-(2-dimethylaminoethoxy) ethanol and N,N,N'-trimethylaminoethylethanolamine.

In step (iv) the molar ratio of isocyanate to isocyanate-reactive groups is preferably between 0.4 and 1, more preferably between 0.6 and 1. Isocyanate-reactive groups are all groups that are able to react with isocyanate groups —NCO, in particular OH, —NH$_2$ and —NHR. In the calculation of the molar ratio all isocyanate-reactive groups that are derived from the reaction product (I), the compound (IV), the equilibrated compound (I), the equilibrated compound (IV) and/or the compound (VI) should be taken into account.

The method according to the invention can furthermore include an additional step (v), in which at least a part of the tertiary amines contained in the product from step (iv) are quaternised by methods known to the person skilled in the art. Suitable quaternisation agents are e.g. dimethyl sulphate, diethyl sulphate, methyl tosylate, methyl chloride, or benzyl chloride. The product is preferably quaternised in the presence of an organic solvent, e.g. butyl diglycol, at temperatures between 10-80° C. Alternatively the compounds provided in step (i), (ii), or (iii) can be subjected individually or jointly to a quaternisation reaction. Preferably >30%, more preferably >50% and still more preferably >60% of all tertiary amines in the end product are quaternised.

A further aspect of the invention is an aqueous emulsion comprising a polysiloxane according to the invention. In a preferred embodiment the aqueous emulsion contains 1-80 wt. %, preferably 1-60 wt. % and more preferably 1-50 wt. % of the polysiloxane according to the invention referred to the overall composition. The components of the aqueous emulsion according to the invention, including water and the polysiloxane according to the invention, can be obtained by mixing processes known to the person skilled in the art at temperatures of preferably 10-80° C. Thus, according to the invention aqueous emulsions can be brought into the emulsified state for example using moderate to high shear forces, for example by means of stirrers, Ultra-Turrax instruments and dispersers or homogenisers. The addition of an acid, for example acetic acid or lactic acid, in this case optionally considerably assists the emulsification process. Surprisingly it is found that the polysiloxanes according to the invention are self-emulsifying, i.e. no additional surfactants are necessary in order to provide macro-emulsions or micro-emulsions.

According to the present invention macro-emulsions are defined by a mean droplet size of ≥350 nm. Micro-emulsions preferably have a mean droplet size of <350 nm.

The aqueous emulsion of the present invention can furthermore contain at least one surfactant and/or at least one solvent and/or at least one acid.

As organic solvent there are preferably used halogenated and non-halogenated hydrocarbons, alcohols, glycols, ethers, esters, ketones, aromatic compounds, for example benzene, phenol or xylene, and polyoxyalkylenes, particularly preferred being butyl diglycol, 1,2-propylene glycol, dipropylene glycol monomethyl ether, dipropylene glycol monobutyl ether, dipropylene glycol monobutyl ether. The solvent is preferably contained in an amount of 0 to 25 wt. %, more preferably in an amount of 0.25 to 10 wt. %, referred to the total preparation. In a preferred embodiment the aqueous emulsion does not contain additional solvent.

As suitable acids there may be used inter alia acetic acid or lactic acid. The amount of acid is preferably from 0.1 to 4 wt. %, more preferably from 0.2 to 2 wt. %, referred to the overall composition. Suitable surfactants are anionic, cationic, non-ionogenic or amphoteric emulsifiers or mixtures thereof. Preferably alkoxylation products of aliphatic alcohols with 6-22 carbon atoms are used, which contain up to 50 mol alkylene oxide units, in particular ethylene oxide and/or propylene oxide units. The alcohols may preferably contain 1-16 carbon atoms; they may be saturated, linearly or preferably branched, and may be used alone or in mixtures. Particularly preferred surfactants are ethoxylates of 2,6,8-trimethyl-4-nonanol, isodecyl alcohol or isotridecyl alcohol with in each case 2-50 mol, in particular 3-15 mol of ethylene oxide units. Of particular advantage as regards low foam formation are the aforementioned surfactants if the alkylene oxide units are present in a random distribution and preferably in a block-type distribution. The surfactant is preferably contained in the aqueous emulsion in an amount of 0.2 to 10 wt. %, more preferably 0.5 to 5 wt. %, referred to the overall preparation. In another preferred embodiment the aqueous emulsion does not contain any additional surfactant.

The aqueous emulsion may furthermore contain additives known to the person skilled in the art, such as for example inorganic and/or organic particles, fatty acid condensates, polyalkylene waxes, fluorinated polymers and/or silicones.

A further object of the invention is the use of the polysiloxanes according to the invention or the aqueous emulsion according to the invention for the finishing of textile fabrics or textile fibres. Textile fabrics or textile fibres that may be finished with the polysiloxanes or aqueous emulsions according to the invention are fabrics, textiles, knitted fabrics and yarns of native fibres, such as for example cotton or wool, but also of synthetic fibres such as for example viscose, polyester, polyamide, polyolefins or polyacrylonitrile. The polysiloxanes and aqueous emulsions according to the present invention are preferably applied in the form of aqueous baths and application liquors, optionally together with further preparation aids, to the textile fabrics or textile fibres. Chemicals for crease-free finishing are for example suitable as additional preparation aids. The polysiloxanes or aqueous emulsions according to the present invention are preferably applied by forced application, for example by impregnating the substrate, followed by squeezing out on the padding machine and a subsequent drying step. Also preferred are conventional exhaustion methods, spray application as well as application by means of pressure methods or flat shear methods. Preferably the textile fabrics or textile fibres contain about 0.1-5 wt. %, more preferably 0.1-2 wt. % of the polysiloxanes according to the invention, referred to the weight of the substrate.

A further aspect of the invention is therefore also a method for finishing textile fabrics or fibres, comprising the application of the polysiloxane according to the invention or the aqueous emulsion according to the invention to the textile fabric or fibres.

A further aspect of the invention is a textile fabric or fibres comprising at least one polysiloxane according to the invention.

In a further embodiment the polysiloxane according to the invention or the aqueous emulsion according to the invention may be used to treat paper or leather. For this, the polysiloxane or the aqueous emulsion is applied to the paper or leather by techniques known to the person skilled in the art. The coating of leather or paper is preferably carried out by spray application, pressure methods, pressure impregnation or knife blade methods. Preferably about 0.1-5 wt. %, more preferably 0.1-2 wt. % of polysiloxane, referred to the weight of the substrate, are applied to paper or leather.

By means of the finishing or modification of the substrate with the polysiloxanes according to the invention desired properties can be achieved, such as for example a soft smooth feel, improved elasticity, antistatic properties, bathochromic shift, surface smoothness, gloss, crease recovery, colour fastness and/or hydrophilicity.

In a further aspect of the invention the polysiloxanes or aqueous emulsions according to the invention are used for cosmetic applications, for example in hair shampoos. In this connection they impart for example a soft feel and an advantageous shine to the hair. Preferably the polysiloxane is used in amounts of 0.1 to 10 wt. % more preferably in amounts of 0.1 to 5 wt. %, referred to the overall composition.

In another aspect of the invention the polysiloxanes or aqueous emulsions according to the invention may be used in clear lacquers or transparent varnishes. Preferably the polysiloxane is used in amounts of 0.1 to 5 wt. %, more preferably in amounts of 0.1 to 5 wt. %, referred to the overall composition. By the use of the polysiloxanes according to the invention the surface roughness can be reduced and the gloss can be enhanced.

It has been shown that the polysiloxanes according to the invention impart to the substrates modified in this way, in particular the textile fabrics or textile fibres, a very good soft feel combined with a very good hydrophilicity. In addition they are characterised by a very low yellowing tendency, as well as by a very good dry heat fixing fastness. In addition the polyurethane organopolysiloxanes according to the invention in their preparations have a low tendency to foam formation and, compared to the polysiloxanes known from the prior art, a significantly improved anion stability and pH stability in use.

EXAMPLES

Comparative Example 1, not According to the Invention

The preparation consists of an aqueous micro-emulsion containing 20 wt. % of FINISH WR 301 from the WACKER company, an aminoethylaminopropyl-functionalised organopolysiloxane, 10 wt. % of an isodecyl alcohol with 7 ethylene oxide groups, and 0.4 wt. % of 60% acetic acid. The total nitrogen content of the organopolysiloxane is 0.39 wt. %.

Comparative Example 2, not According to the Invention

The commercially available preparation RUCOFIN SIQ consists of an aqueous micro-emulsion of a polysiloxane modified with quaternary ammonium functions with a dry substance content of 24.5%.

Comparative Example 3, not According to the Invention

The preparation was prepared as described in WO 2004/044306, Table 2, mixture 12c. The dry substance was adjusted with water to 25 wt. %.

Comparative Example 4, not According to the Invention 516.6 g (0.1 mol) of an α, ω-dihydrogen polydimethylsiloxane with 0.039 wt. % of Si-bound hydrogen are reacted similarly to Example 1 of EP 1753804 with 149.8 g (0.2 mol) of an alkyl alcohol polyether having the commercial name Pluriol A 750 R from the company BASF SE to form a polyether-modified polydimethylsiloxane of the formula

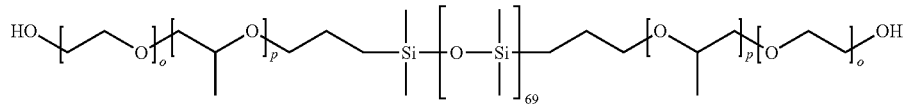

120 g (0.036 mol OH) of the obtained organopolysiloxane are mixed with 2.4 g (0.040 mol OH) N-methyldiethanolamine and 0.7 g (0.007 mol NH) N-methylpiperazine and heated to 45° C. 50 mg of di-n-butyl tin dilaurate as well as 9.2 g (0.083 mol NCO) of isophorone diisocyanate are added to the mixture. After a rise in temperature of ca. 5° C. the mixture is stirred for a further 1 hour at 50° C. The completeness of the reaction is checked by means of NCO titration. A clear, highly viscous yellow oil is obtained.

25 g of the obtained oil are mixed with 1 g of 60% acetic acid and heated to 50° C. while stirring. 74 g of water are added in portions at 50° C. while stirring. A white emulsion is obtained having a mean particle size of 250 nm.

Example 5, According to the Invention

The preparation of the polyether-functional organopolysiloxane is carried out by reacting 539.2 g (0.1 mol) of α,ω-diepoxypolydimethylsiloxane of the formula

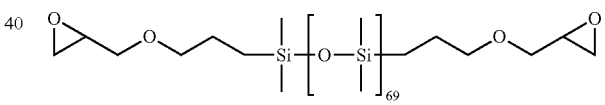

with 150 g (0.2 mol) of a singly methyl-capped polyethylene glycol with a mean molecular weight of 750 g/mol, similarly to Example 1 of U.S. Pat. No. 6,495,727 B1.

30 g (0.009 mol OH) of the obtained organopolysiloxane are mixed with 84 g (0.025 mol OH) of the organopolysiloxane precursor obtained in comparative Example 4. 2.4 g (0.040 mol OH) N-methyldiethanolamine and 1.2 g (0.013 mol OH) N,N-dimethylethanolamine are added to the mixture and heated to 45° C. 50 mg of di-n-butyl tin dilaurate as well as 9.7 g of isophorone diisocyanate (0.088 mol NCO) are added to the mixture. After a rise in temperature of ca. 5° C. the reaction mixture is stirred for a further 1 hour at 45° C. The completeness of the reaction is checked by means of NCO titration. A clear, highly viscous yellow oil is obtained.

The emulsification is carried out similarly to comparative Example 4. A whitish, transparent emulsion with a mean particle size of 150 nm is obtained.

Example 6, According to the Invention

The preparation of the aminopolyether-functional organopolysiloxane is carried out by reacting 539.2 g (0.1 mol) of α,ω-diepoxypolydimethylsiloxane of the formula

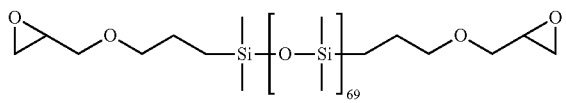

with 120 g (0.2 mol) of an amino-functional, methyl-capped polyether having the commercial trade name Jeffamine M 600 with a mean molecular weight of ca. 600 g/mol.

36 g (0.011 mol NH, 0.011 mol OH) of the obtained organopolysiloxane are mixed with 84 g (0.025 mol OH) of the organopolysiloxane precursor obtained in comparative Example 4. 2.2 g (0.036 mol OH) of N-methyldiethanolamine and 1.2 g (0.013 mol OH) of N,N-dimethylethanolamine are added to the mixture and heated to 45° C. 50 mg of di-n-butyl tin dilaurate as well as 9.5 g (0.086 mol NCO) of isophorone diisocyanate are added to the mixture. After a rise in temperature of ca. 5° C. the mixture is stirred for a further 1 hour at 45° C. The completeness of the reaction is checked by means of NCO titration. A clear, highly viscous yellow oil is obtained.

The emulsification is carried out similarly to comparative Example 4. A whitish, transparent emulsion with a mean particle size of 150 nm is obtained.

Example 7, According to the Invention 36 g (0.010 mol OH) of the organopolysiloxane precursor obtained in Example 5 are mixed with 84 g (0.025 mol OH) of the compound obtained in comparative Example 4. 2.4 g (0.040 mol OH) of N-methyldiethanolamine and 0.7 g (0.007 mol NH) of N-methylpiperazine are added to the mixture and heated to 45° C. 50 mg of di-n-butyl tin dilaurate as well as 9.2 g (0.083 mol NCO) of isophorone diisocyanate are added to the mixture. After a rise in temperature of ca. 5° C. the mixture is stirred for a further 1 hour at 45° C. The completeness of the reaction is checked by means of NCO titration. A clear, highly viscous yellow oil is obtained.

The emulsification is carried out similarly to comparative Example 4. A whitish, transparent emulsion with a mean particle size of 140 nm is obtained.

Example 8, According to the Invention 120 g (0.036 mol OH) of the organopolysiloxane precursor obtained in Example 5 are mixed with 2.4 g (0.040 mol OH) of N-methyldiethanolamine and 0.7 g (0.007 mol NH) of N-methylpiperazine and heated to 45° C. 50 mg of di-n-butyl tin dilaurate as well as 9.3 g (0.083 mol NCO) of isophorone diisocyanate are added to the mixture. After a rise in temperature of ca. 5° C. the mixture is stirred for a further 1 hour at 45° C. The completeness of the reaction is checked by means of NCO titration. A clear, highly viscous yellow oil is obtained.

The emulsification is carried out similarly to comparative Example 4. A whitish, transparent emulsion with a mean particle size of 120 nm is obtained.

Weight composition of the produced organopolysiloxanes:

| Example | PDMS content [wt. %] | Content of polyether overall [wt. %] | Content of lateral polyether [wt. %] | Titratable basic nitrogen [wt. %] |
|---|---|---|---|---|
| Comparative Example 4 | 72.9 | 20.4 | 0 | 0.35 |
| 5 | 71.4 | 20.0 | 5.1 | 0.36 |
| 6 | 72.0 | 19.2 | 4.9 | 0.33 |
| 7 | 72.4 | 20.2 | 5.9 | 0.34 |
| 8 | 71.0 | 19.7 | 19.7 | 0.35 |

Feel Evaluation

Sections of a bleached, optically non-brightened cotton terry cloth were finished with an aqueous liquor containing 20 g/l of the respective preparation according to Examples 1-8 and 0.5 g/l of acetic acid (60%) on a laboratory padding machine with a wet uptake of 80% and were then dried for 2 minutes at 120° C. After the treatment the test fabric treated with the emulsion is conditioned for 2 hours in a standard atmosphere as described in ISO 139 at 65% relative atmospheric humidity and a temperature of 20° C. The evaluation of the feel character of the test fabric was then carried out. This evaluation is subject to individually different, subjective criteria. In order nevertheless to obtain valid meaningful results, an evaluation by at least 5 test persons is necessary. The evaluation of the results was carried out by statistical methods, in which the score 1.0 denotes the softest, most pleasant feel, and the score 5 denotes the hardest, least smooth surface and most unpleasant feel within the test series.

Feel Evaluation within the Test Series

| Comparative Example 1 | 1.1 |
| Comparative Example 2 | 1.3 |
| Comparative Example 3 | 2.3 |
| Comparative Example 4 | 2.1 |
| Example 5 | 1.4 |
| Example 6 | 1.0 |
| Example 7 | 1.3 |
| Example 8 | 1.2 |
| Untreated | 5 |

The preparations 5-8 according to the invention confer an excellent soft feel on the textiles finished with the preparations.

Yellowing

Sections of a bleached, non-optically brightened cotton modal knitwear were impregnated with an aqueous liquor containing 20 g/l of the respective preparations according to Examples 1-10 and 0.5 g/l of 60% acetic acid on a laboratory padding machine with a wet uptake of 80%, dried for 2 minutes at 120° C., and then thermally fixed for 2 minutes at 170° C. The whiteness of the sample according to Ganz was then measured on the "Datacolor 600" whiteness meter of the company "Datacolor international" (Switzerland).

Whiteness According to Ganz

| Comparative Example 1 | 183 |
| Comparative Example 2 | 205 |
| Comparative Example 3 | 199 |
| Comparative Example 4 | 201 |
| Example 5 | 203 |

| | |
|---|---|
| Example 6 | 200 |
| Example 7 | 202 |
| Example 8 | 204 |
| Untreated | 203 |

The preparations according to the invention do not lead to any yellowing of the textile substrate. The whiteness of the substrates finished with the preparations according to the invention corresponds to that of the untreated textile.

Alkali Stability

The stability of the emulsions to alkalis in finishing liquors was carried out according to the following described test:

500 ml of an aqueous solution of the emulsion to be investigated having a concentration of 40 g/l were placed in a 1000 ml beaker and adjusted with sodium hydroxide solution (w(NaOH)=10%) to a pH of 11. The liquor was then stirred for 20 minutes with a paddle stirrer at 2000 rpm. The stirrer was then switched off and the liquid surface was evaluated after 1 hour as regards the formation of deposits.

| | Evaluation after 1 hour |
|---|---|
| Comparative Example 1 | marked deposits |
| Comparative Example 2 | no deposits |
| Comparative Example 3 | slight deposits |
| Comparative Example 4 | slight deposits |
| Example 5 | no deposits |
| Example 6 | no deposits |
| Example 7 | no deposits |
| Example 8 | no deposits |

The preparations according to the invention have at pH 11 no tendency to form deposits. Such preparations can be classed as pH stable.

Anion Stability

The stability of the emulsions to anions in finishing liquors was carried out according to the following described test:

500 ml of an aqueous solution containing 10 g of the emulsion to be investigated and 20 ml of a 0.5% dodecylbenzenesulphonic acid solution were placed in a 1000 ml beaker and adjusted with 60% acetic acid to a pH of 4.5. The liquor was then heated to 40° C. and stirred at this temperature for 30 minutes with a paddle stirrer at 2000 rpm. The stirrer was then switched off and after stirring for 2 hours the solution was investigated as regards its turbidity, as well as the liquid surface and deposits.

| | Appearance of the liquor after 2 hours | Evaluation after 2 hours |
|---|---|---|
| Comparative Example 1 | Turbid | Marked deposits |
| Comparative Example 2 | Turbid | Marked deposits |
| Comparative Example 3 | Slightly turbid | Slight deposits |
| Comparative Example 4 | Slightly turbid | Slight deposits |
| Example 5 | Clear | No deposits |
| Example 6 | Clear | No deposits |
| Example 7 | Clear | No deposits |
| Example 8 | Clear | No deposits |

Hydrophilicity

The hydrophilicity of the articles after the finishing was evaluated by the TEGEWA droplet test (Melliand textile reports 68 (1987), 581-583). To carry out the test the finished fabric is stretched horizontally on a suitable stretching device so that it does not come into contact with the base. From a height of 40 mm a water droplet of size 0.050 ml (±10%) is dropped onto the fabric. The time measurement is started as soon as the droplet strikes the fabric to be tested. The time measurement is stopped when the droplet has completely sunk into the fabric and the shine has disappeared.

| | Amount used in g/l | Sinking time in seconds |
|---|---|---|
| Comparative Example 1 | 20 | >120 |
| Comparative Example 2 | 20 | <1 |
| Comparative Example 3 | 20 | 4 |
| Comparative Example 4 | 20 | 5 |
| Example 5 | 20 | 1 |
| Example 6 | 20 | 2 |
| Example 7 | 20 | 1 |
| Example 8 | 20 | <1 |
| Untreated | 0 | <1 |

Foam Behaviour

To evaluate the foam behaviour 1 litre of a liquor is made up with 3 g/l of the preparations prepared according to the examples. The liquor is added to a laboratory jet of the company MATHIS and rotated at 40° C. and 1000 rpm. After 10 minutes the foam height is measured. The maximum foam height is 10 cm, the minimum 0 cm. A low foam height should be regarded as positive.

| | Foam height in cm |
|---|---|
| Comparative Example 1 | 9 |
| Comparative Example 2 | 8 |
| Comparative Example 3 | 5 |
| Comparative Example 4 | 6 |
| Example 5 | 3 |
| Example 6 | 2 |
| Example 7 | 3 |
| Example 8 | 1 |

Dry Heat Fixing Fastness

The testing of the finished textile fabrics for colour fastness is carried out according to EN ISO 105-P01. A sample having the dimensions of the heating device is removed from the coloured and finished textile to be investigated and placed between the two individual-fibre adjacent fabrics having the same dimensions and sown on a narrow side to form a test piece. The test piece is placed in the heating device and treated for 30 sec at 150°, 180° or 210° C. The surface pressure on the test piece is 4 kPa. After the treatment the test piece is exposed for 4 hours to a standard climate as described in ISO 139 at 65% relative atmospheric humidity and a temperature of 20° C. The change in colour is evaluated according to the greyness scale (ISO 105 A02). The evaluation of the adjacent fabrics is carried out by a comparison between the stained adjacent fabrics and the adjacent fabrics treated in the blind test, using the greyness scale (ISO 105 A03) to evaluate the staining and bleeding. In this connection the best results are accorded a score of 5, and the worst results a score of 1.

Evaluation of the Test Piece and Adjacent Fabric:

| | Test piece | | | Adjacent fabric | | |
|---|---|---|---|---|---|---|
| | 150° C. | 180° C. | 210° C. | 150° C. | 180° C. | 210° C. |
| Comparative Example 1 | 2-3 | 2 | 1 | 2-3 | 2 | 1 |

-continued

|  | Test piece | | | Adjacent fabric | | |
| --- | --- | --- | --- | --- | --- | --- |
|  | 150° C. | 180° C. | 210° C. | 150° C. | 180° C. | 210° C. |
| Comparative Example 2 | 2-3 | 1 | 1 | 2 | 1 | 1 |
| Comparative Example 3 | 3-4 | 3 | 2 | 4 | 3-4 | 2 |
| Comparative Example 4 | 4 | 3 | 2 | 4-5 | 3-4 | 2-3 |
| Example 5 | 4-5 | 3-4 | 2-3 | 4 | 3-4 | 3 |
| Example 6 | 5 | 4 | 3 | 4-5 | 4 | 3 |
| Example 7 | 4-5 | 3-4 | 2-3 | 4-5 | 4 | 3 |
| Example 8 | 4-5 | 4 | 3-4 | 4-5 | 3-4 | 2-3 |
| Untreated | 5 | 4-5 | 4 | 4-5 | 4 | 3 |

The test pieces finished with the preparations 5-8 according to the invention have a significantly reduced colour change and a lower tendency to staining and bleeding, in particular compared to the test pieces that were finished with the preparations 1 and 2 that contained emulsifiers as additives.

The present invention is described in more detail by the following points:

1. Polysiloxane obtainable by a method comprising the following steps:
   (i) providing at least one reaction product (I) of a compound (II) having the formula

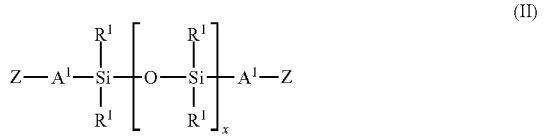

(II)

wherein
   $R^1$ may be identical or different and denotes an optionally substituted hydrocarbon radical with 1-18 carbon atoms per radical,
   $A^1$ denotes independently of one another a divalent linear or branched group with up to 8 carbon atoms and optionally with up to 4 hetero atoms,
   x is an integer from 1 to 1000, preferably 1 to 500, and
   Z is

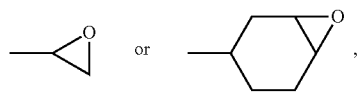

optionally substituted by $C_{1-8}$-alkyl,
   with at least one compound (III) selected from primary amine, secondary amine and monohydric alcohol, which optionally contains at least one polyether radical, wherein at least one reaction product (I) contains at least one polyether radical that was introduced by the compound (III);
   (ii) optionally providing at least one compound (IV) of the formula

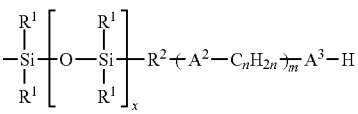

(IV)

wherein
   $R^1$ and x are as defined above,
   $R^2$ is independently of one another a divalent branched or linear $C_{2-8}$-alkyl, optionally substituted with carbonyl,
   $A^2$ independently of one another is selected from the group consisting of —O—, —C(O)—O—, —O—C(O)—, —O—C(O)—O—, —C(O)—NH—, —NH—C(O)—, —NH—C(O)—O— and —NH—C(O)—NH—
   $A^3$ independently of one another is selected from the group consisting of —O—, —NHH— and —NR'—,
   R' is a monovalent hydrocarbon radical with 1 to 18 carbon atoms,
   n independently of one another is an integer from 1 to 20, preferably 2 or 3, and
   m independently of one another is an integer from 0 to 150, preferably 0 to 70, more preferably 0 to 30;
   (iii) optionally equilibrating at least one reaction product (I) and/or at least one compound (IV) with a cyclic or linear polysiloxane, and
   (iv) reacting the reaction product (I) or of the equilibrated reaction product (I) from step (iii) and optionally the compound (IV) or the equilibrated compound (IV) from step (iii) with at least one organic compound (V) that having at least two isocyanate groups per molecule.

2. Polysiloxane according to point 1, wherein the reaction in step (i) results in a ring opening in the compound (II).

3. Polysiloxane according to any one of points 1 or 2, wherein $R^1$ is selected from the group consisting of $C_{1-6}$-alkyl, aryl or benzyl, preferably $C_{1-6}$-alkyl, more preferably methyl or ethyl.

4. Polysiloxane according to any one of the preceding points, wherein $A^1$ is $C_{1-8}$-alkyl or —$C_{1-6}$-alkyl-O—$C_{1-6}$-alkyl, preferably —$CH_2$—$CH_2$—$CH_2$—O—$CH_2$—.

5. Polysiloxane according to any one of the preceding points, wherein the compound (III) is selected from

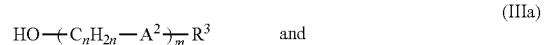

(IIIa)

and

(IIIb)

wherein
   $A^2$, m and n are as defined above,
   $R^3$ is $C_{1-22}$-alkyl, $C_2$-$C_{22}$-alkenyl, $C_2$-$C_{22}$-alkynyl, aryl, optionally substituted with at least one styryl, or $C_6$-$C_{22}$-alkaryl,
   $R^4$ is H, $C_{1-8}$-alkyl, heterocyclyl, aryl or —$(C_nH_{2n}$-$A^2)_m$-$R^3$,
   $R^{4'}$ is $C_{1-8}$-alkyl, heterocyclyl, aryl or —$(C_nH_{2n}$-$A^2)_m$-$R^3$.

6. Polysiloxane according to any one of the preceding points, wherein $R^2$ is optionally substituted divalent $C_{2-8}$-alkyl.

7. Polysiloxane according to any one of the preceding points, wherein the equilibration in step (iii) is base or acid catalysed, preferably base catalysed.
8. Polysiloxane according to any one of the preceding points, wherein the polysiloxane for the equilibration in step (iii) is polydi-$C_{1-6}$-alkylsiloxane, preferably polydimethylsiloxane, preferably oligodimethylsiloxane, still more preferably cyclic oligo- or polydimethylsiloxane.
9. Polysiloxane according to any one of the preceding points, wherein the compound (V) is selected from hexamethylene-1,6-diisocyanate, isophorone diisocyanate, toluylene-2,4-diisocyanate, toluylene-2,6-diisocyanate, phenylene-1,3-diisocynate, 4,4'-methylene-bis(cyclohexyl isocyanate), 4,4'-methylene-bis(phenyl isocyanate) and dimethylphenyl diisocyanate.
10. Polysiloxane according to any one of the preceding points, wherein in step (iv) furthermore at least one compound (VI) comprising at least one isocyanate-reactive group is present.
11. Polysiloxane according to point 10, wherein the compound (VI) is selected from

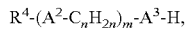

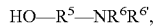

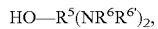

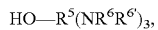

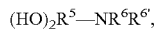

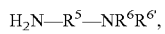

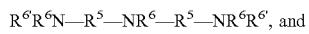

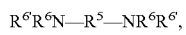

wherein
$R^4$, $A^2$, $A^3$, n and m are as defined above,
$R^5$ independently of one another is optionally substituted divalent, trivalent or tetravalent $C_{1-8}$-alkyl, $C_{1-8}$-alkyl-O—$C_{1-8}$-alkyl or aryl,
$R^6$ is H, optionally substituted $C_{1-18}$-alkyl or aryl, and
$R^{6'}$ is optionally substituted $C_{1-18}$-alkyl or aryl, or
$R^6$ and $R^{6'}$ together with the nitrogen atom form a heterocycle, which may optionally contain further hetero atoms and is optionally substituted with $C_{1-8}$-alkyl.
12. Polysiloxane according to any one of the preceding points, wherein in step (iv) the molar ratio of isocyanate groups to isocyanate-reactive groups is between 0.4 and 1, preferably between 0.6 and 1.
13. Polysiloxane according to any one of the preceding points, wherein the conversion in step (iv) is carried out above room temperature, optionally with the use of at least one solvent and/or a catalyst.
14. Aqueous emulsion comprising a polysiloxane according to any one of points 1 to 13.
15. Aqueous emulsion according to point 14, in addition comprising at least one surfactant and/or a solvent and/or an acid.
16. Use of a polysiloxane according to any one of points 1 to 13 or an emulsion according to point 14 or 15 for finishing textile fabrics or textile fibres.
17. Use of a polysiloxane according to any one of points 1 to 13 or an emulsion according to point 14 or 15 for treating paper or leather.
18. Use of a polysiloxane according to any one of points 1 to 13 or an emulsion according to point 14 or 15 for cosmetic applications.
19. Use of a polysiloxane according to any one of points 1 to 13 or an emulsion according to point 14 or 15 in lacquers or varnishes.
20. Textile fabrics or fibres comprising a polysiloxane according to any one of points 1 to 13.
21. Method for finishing textile fabrics or fibres, comprising applying the polysiloxane according to any one of points 1 to 13 or the emulsion according to point 14 or 15 to the textile fabric or the fibres.

The invention claimed is:
1. A polysiloxane obtained by a method comprising:
(i) providing at least one reaction product (I) of a compound (II) having the formula

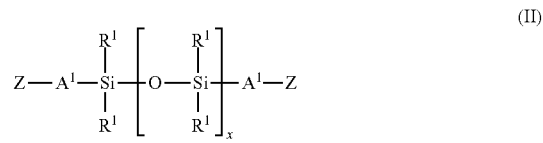

wherein
$R^1$ may be identical or different and denotes an optionally substituted hydrocarbon radical with 1-18 carbon atoms per radical,
$A^1$ denotes independently of one another a divalent linear or branched group with up to 8 carbon atoms and optionally with up to 4 hetero atoms,
x is an integer from 1-1000, and
Z is

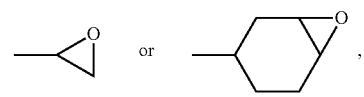

optionally substituted by $C_{1-8}$-alkyl,
with at least one compound (III) selected from primary amines, secondary amines and monohydric alcohols, which optionally contains at least one polyether radical,
wherein at least one reaction product (I) contains at least one polyether radical that was introduced by the compound (III);
(ii) optionally providing at least one compound (IV) of the formula

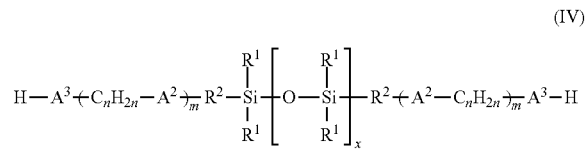

wherein
$R^1$ and x are as defined above,
$R^2$ is independently of one another a divalent branched or linear $C_{2-8}$-alkyl, optionally substituted with carbonyl,
$A^2$ independently of one another is selected from the group consisting of —O—, —C(O)—O—, —O—C (O)—,   —O—C(O)—O—,   —C(O)—NH—, —NH—C(O)—,   —NH—C(O)—O— and —NH—C(O)—NH—

$A^3$ independently of one another is selected from the group consisting of —O—, —NH— and NR'—, R' is a monovalent hydrocarbon radical with 1 to 18 carbon atoms, n independently of one another is an integer from 1 to 20, preferably 2 or 3, and m independently of one another is an integer from 0 to 150;

(iii) optionally equilibrating at least one reaction product (I) and/or at least one compound (IV) with a cyclic or linear polysiloxane, and (iv) reacting the reaction product (I) or the equilibrated reaction product (I) from paragraph (iii) and optionally the compound (IV) or the equilibrated compound (IV) from paragraph (iii) with at least one organic compound (V) that has at least two isocyanate groups per molecule.

2. The polysiloxane according to claim 1, wherein $R^1$ is selected from the group consisting of $C_{1-6}$-alkyl, aryl or benzyl.

3. The polysiloxane according claim 1, wherein $A^1$ is $C_{1-8}$-alkyl or —$C_{1-6}$-alkyl-O—$C_{1-6}$-alkyl.

4. The polysiloxane according to claim 1, wherein the compound (III) is selected from

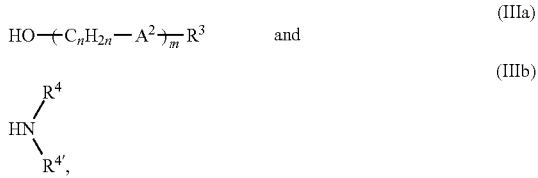

wherein $A^2$, m and n are as defined above, $R^3$ is $C_{1-22}$-alkyl, $C_2$-$C_{22}$-alkenyl, $C_2$-$C_{22}$-alkynyl, aryl, optionally substituted with at least one styryl, or $C_6$-$C_{22}$-alkaryl, $R^4$ is H, $C_{1-8}$ alkyl, heterocyclic, aryl or —$(C_nH_{2n}$-$A^2)_m$-$R^3$, and $R^{4'}$ is $C_{1-8}$ alkyl, heterocyclic, aryl or —$(C_nH_{2n}$-$A^2)_m$-$R^3$.

5. The polysiloxane according to claim 1, wherein the equilibration of paragraph (iii) is performed and the polysiloxane for the equilibration is polydi-$C_{1-6}$-alkylsiloxane.

6. The polysiloxane according to claim 1, wherein the compound (V) is selected from hexamethylene-1,6-diisocyanate, isophorone diisocyanate, toluene-2,4-diisocyanate, toluene-2,6-diisocyanate, phenylene-1,3-diisocynate, 4,4'-methylene-bis(cyclohexyl isocyanate), 4,4'-methylene-bis(phenyl isocyanate) and dimethylphenyl diisocyanate.

7. The polysiloxane according to claim 1, wherein in paragraph (iv) furthermore at least one compound (VI) comprising at least one isocyanate-reactive group is present, which is selected from $R^4$-($A^2$-$C_nH_{2n}$)m-$A^3$-H,

HO—$R^5$—$R^6$—$R^5$—OH

HO—$R^5$—$NR^6R^{6'}$,

HO—$R^5(NR^6R^{6'})_2$,

HO—$R^5(NR^6R^{6'})_3$, $(HO)_2R^5$—$NR^6R^{6'}$, $HNR^6R^{6'}$, $H_2N$—$R^5$—$NR^6R^{6'}$, $R^6R^{6'}N$—$R^5$—$NR^6$—$R^5$—$NR^6R^{6'}$, and $R^6R^{6'}N$—$R^5$—$NR^6R^{6'}$, wherein $R^4$, $A^2$, $A^3$, n and m are as defined above, $R^5$ independently of one another is an optionally substituted divalent, trivalent or tetravalent $C_{1-8}$-alkyl, $C_{1-8}$-alkyl-O—$C_{1-8}$-alkyl or aryl, $R^6$ is Han optionally substituted $C_{1-18}$-alkyl or aryl, and $R^{6'}$ is an optionally substituted $C_{1-18}$-alkyl or aryl, or $R^6$ and $R^{6'}$ together with the nitrogen atom form a heterocycle, which can optionally contain further hetero atoms and is optionally substituted with $C_{1-8}$-alkyl.

8. The polysiloxane according to claim 1, wherein in paragraph (iv) the molar ratio of isocyanate groups to isocyanate-reactive groups is between 0.4 and 1.

9. An aqueous emulsion comprising a polysiloxane according to claim 1, optionally further comprising at least one surfactant and/or a solvent and/or an acid.

10. A method for finishing textile fabrics or textile fibres, for treating paper or leather, for imparting softness or shine in cosmetic applications, or for reducing surface roughness or enhancing gloss in lacquers or in varnishes comprising applying or adding the suspension according to claim 9 thereto.

11. A method for finishing a textile fabric or fibres, comprising applying the emulsion according to claim 9 to the textile fabric or the fibres.

12. A method for finishing textile fabrics or textile fibres, for treating paper or leather, for imparting softness or shine in cosmetic applications or for reducing surface roughness or enhancing gloss in lacquers or in varnishes comprising applying or adding the polysiloxane according to claim 1 thereto.

13. Textile fabrics or fibres, comprising a polysiloxane according to claim 1.

14. A method for finishing a textile fabric or fibres, comprising applying the polysiloxane according to claim 1 to the textile fabric or the fibres.

15. The method of claim 1 wherein x is an integer from 1 to 500, and m is 0 to 70, and at least one compound (III) is selected from primary amines, and secondary amines, which optionally contains at least one polyether radical.

16. The method of claim 1 wherein at least one compound (IV) is provided and is equilibrated with a cyclic or linear polysiloxane, and the equilibrated compound (IV) is reacted with the at least one organic compound (V), and the reaction product (I) or an equilibrated reaction product (I).

17. The method of claim 1 wherein at least one compound (IV) is provided is reacted with the at least one organic compound (V), and the reaction product (I) or an equilibrated reaction product (I).

18. The polysiloxane according to claim 1, wherein $R^1$ is selected from the group consisting of $C_{1-6}$-alkyl.

19. The polysiloxane according to claim 1, wherein the equilibration of paragraph (iii) is performed and the polysiloxane for the equilibration is polydimethylsiloxane, oligodimethylsiloxane, cyclic oligo- or polydimethylsiloxane.

20. The polysiloxane according to claim 1, wherein in paragraph (iv) furthermore at least one compound (VI) comprising at least one isocyanate-reactive group is present.

* * * * *